(12) United States Patent
Allen-Atkins

(10) Patent No.: US 7,048,421 B1
(45) Date of Patent: May 23, 2006

(54) SELF-CONTAINED LIGHT-EMITTING MEANS FOR A VEHICLE

(76) Inventor: Linda Marie Allen-Atkins, 1204 Cordova Dr., Allen, TX (US) 75013

( * ) Notice: Subject to any disclaimer, the term of this patent is extended or adjusted under 35 U.S.C. 154(b) by 70 days.

(21) Appl. No.: 10/339,892

(22) Filed: Jan. 10, 2003

(51) Int. Cl.
*B60Q 1/00* (2006.01)
*B60Q 1/26* (2006.01)

(52) U.S. Cl. .................. 362/500; 362/192

(58) Field of Classification Search ............ 362/192, 362/545, 544, 500, 249, 252
See application file for complete search history.

(56) References Cited

U.S. PATENT DOCUMENTS

| | | | |
|---|---|---|---|
| 3,971,977 A * | 7/1976 | Hirt et al. ................. 322/1 |
| 4,725,928 A | 2/1988 | Strepek |
| 4,775,919 A * | 10/1988 | Pearsall et al. ............ 362/500 |
| 4,782,431 A * | 11/1988 | Park ........................ 362/161 |
| 4,800,469 A | 1/1989 | Leon |
| 4,881,153 A | 11/1989 | Scott |
| D332,441 S | 1/1993 | Douglas, Jr. |
| 5,278,732 A | 1/1994 | Frankum |
| 5,278,733 A | 1/1994 | St. Thomas |
| 5,497,302 A * | 3/1996 | O'Donnell .................. 362/500 |
| 5,857,762 A * | 1/1999 | Schwaller .................. 362/473 |
| 6,086,214 A * | 7/2000 | Ridge ........................ 362/96 |
| 6,501,199 B1 * | 12/2002 | Hung ....................... 310/67 A |
| 6,731,072 B1 * | 5/2004 | Huang ....................... 315/77 |
| 2003/0165063 A1 * | 9/2003 | Liaw ......................... 362/500 |
| 2004/0042206 A1 * | 3/2004 | Luo .......................... 362/192 |

* cited by examiner

*Primary Examiner*—John Anthony Ward
*Assistant Examiner*—Jacob Y. Choi

(57) ABSTRACT

A self-contained light-emitting means for a vehicle for not only expressing oneself but also to make the vehicle more visible. The self-contained light-emitting means for a vehicle includes a rotor securely mounted to the axle of a vehicle for rotation therewith, a stator which includes a cylindrical ring having a bore therethrough and a counterweight member integrally attached to the cylindrical ring being disposed about the rotor which is rotatably disposed within the bore of the cylindrical ring, a plurality of magnetic members attached about the rotor, a plurality of brushes also attached about the rotor, a contact member mounted to the rotor, a plurality of sets of wires mounted to the cylindrical ring and being connected to a plurality of coil members, a circuit board connected with wires to the brushes and being connected with wires to light-emitting members such as light bulbs.

1 Claim, 3 Drawing Sheets

SELF-CONTAINED LIGHT-EMITTING MEANS FOR A VEHICLE

BACKGROUND OF THE INVENTION

1. Field of the Invention

The present invention relates to light being generated by movement of a vehicle and being displayed on the wheel and more particularly pertains to a new self-contained light-emitting means for a vehicle for not only expressing oneself but also to make the vehicle more visible.

2. Description of the Prior Art

The use of light being generated by movement of a vehicle and being displayed on the wheel is known in the prior art. More specifically, light being generated by movement of vehicle and being displayed on the wheel heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,881,153; U.S. Pat. No. 5,278,732; U.S. Pat. No. 4,725,928; U.S. Pat. No. Des. 332,441; U.S. Pat. No. 4,800,469; and U.S. Pat. No. 5,278,733.

While these devices fulfill their respective, particular objectives and requirements, the aforementioned patents do not disclose a new self-contained light-emitting means for a vehicle. The inventive device includes a rotor securely mounted to the axle of a vehicle for rotation therewith, a stator which includes a cylindrical ring having a bore therethrough and a counterweight member integrally attached to the cylindrical ring being disposed about the rotor which is rotatably disposed within the bore of the cylindrical ring, a plurality of magnetic members attached about the rotor, a plurality of brushes also attached about the rotor, a contact member mounted to the rotor, a plurality of sets of wires mounted to the cylindrical ring and being connected to a plurality of coil members, a circuit board connected with wires to the brushes and being connected with wires to light-emitting members such as light bulbs.

In these respects, the self-contained light-emitting means for a vehicle according to the present invention substantially departs from the conventional concepts and designs of the prior art, and in so doing provides an apparatus primarily developed for the purpose of not only expressing oneself but also to make the vehicle more visible.

SUMMARY OF THE INVENTION

In view of the foregoing disadvantages inherent in the known types of light being generated by movement of vehicle and being displayed on the wheel now present in the prior art, the present invention provides a new self-contained light-emitting means for a vehicle construction wherein the same can be utilized for not only expressing oneself but also to make the vehicle more visible.

The general purpose of the present invention, which will be described subsequently in greater detail, is to provide a new self-contained light-emitting means for a vehicle which has many of the advantages of the light being generated by movement of vehicle and being displayed on the wheel mentioned heretofore and many novel features that result in a new self-contained light-emitting means for a vehicle which is not anticipated, rendered obvious, suggested, or even implied by any of the prior art light being generated by movement of a vehicle and being displayed on the wheel, either alone or in any combination thereof.

To attain this, the present invention generally comprises a rotor securely mounted to the axle of a vehicle for rotation therewith, a stator which includes a cylindrical ring having a bore therethrough and a counterweight member integrally attached to the cylindrical ring being disposed about the rotor which is rotatably disposed within the bore of the cylindrical ring, a plurality of magnetic members attached about the rotor, a plurality of brushes also attached about the rotor, a contact member mounted to the rotor, a plurality of sets of wires mounted to the cylindrical ring and being connected to a plurality of coil members, a circuit board connected with wires to the brushes and being connected with wires to light-emitting members such as light bulbs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new self-contained light-emitting means for a vehicle which has many of the advantages of the light being generated by movement of a vehicle and being displayed on the wheel mentioned heretofore and many novel features that result in a new self-contained light-emitting means for a vehicle which is not anticipated, rendered obvious, suggested, or even implied by any of the prior art light being generated by movement of vehicle and being displayed on the wheel, either alone or in any combination thereof.

It is another object of the present invention to provide a new self-contained light-emitting means for a vehicle which may be easily and efficiently manufactured and marketed.

It is a further object of the present invention to provide a new self-contained light-emitting means for a vehicle which is of a durable and reliable construction.

An even further object of the present invention is to provide a new self-contained light-emitting means for a vehicle which is susceptible of a low cost of manufacture with regard to both materials and labor, and which accordingly is then susceptible of low prices of sale to the consuming public, thereby making such self-contained light-emitting means for a vehicle economically available to the buying public.

Still yet another object of the present invention is to provide a new self-contained light-emitting means for a vehicle which provides in the apparatuses and methods of the prior art some of the advantages thereof, while simultaneously overcoming some of the disadvantages normally associated therewith.

Still another object of the present invention is to provide a new self-contained light-emitting means for a vehicle for not only expressing oneself but also to make the vehicle more visible.

Yet another object of the present invention is to provide a new self-contained light-emitting means for a vehicle which includes a rotor securely mounted to the axle of a vehicle for rotation therewith, a stator which includes a cylindrical ring having a bore therethrough and a counterweight member integrally attached to the cylindrical ring being disposed about the rotor which is rotatably disposed within the bore of the cylindrical ring, a plurality of magnetic members attached about the rotor, a plurality of brushes also attached about the rotor, a contact member mounted to the rotor, a plurality of sets of wires mounted to the cylindrical ring and being connected to a plurality of coil members, a circuit board connected with wires to the brushes and being connected with wires to light-emitting members such as light bulbs.

Still yet another object of the present invention is to provide a new self-contained light-emitting means for a vehicle that allows a person to freely expressing oneself by using light being emitted from one's own vehicle.

Even still another object of the present invention is to provide a new self-contained light-emitting means for a vehicle that enhances vehicle safety and appearance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
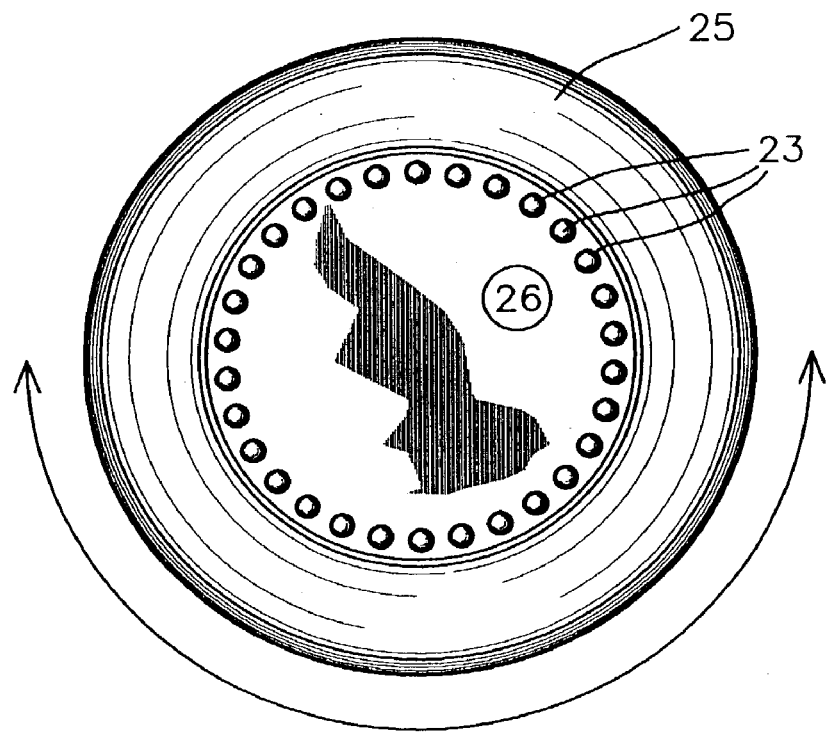
FIG. 1 is a side elevational view of a wheel showing the light-emitting members of the self-contained light-emitting means for a vehicle being mounted thereto.
Figure 2:
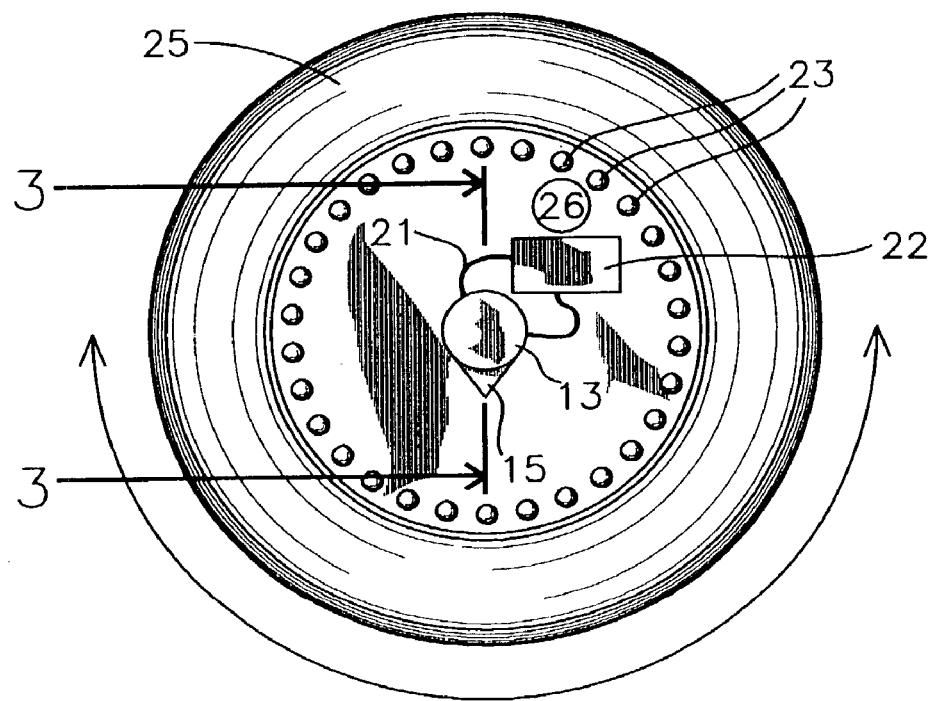
FIG. 2 is a side elevational view of the present invention.
Figure 3:
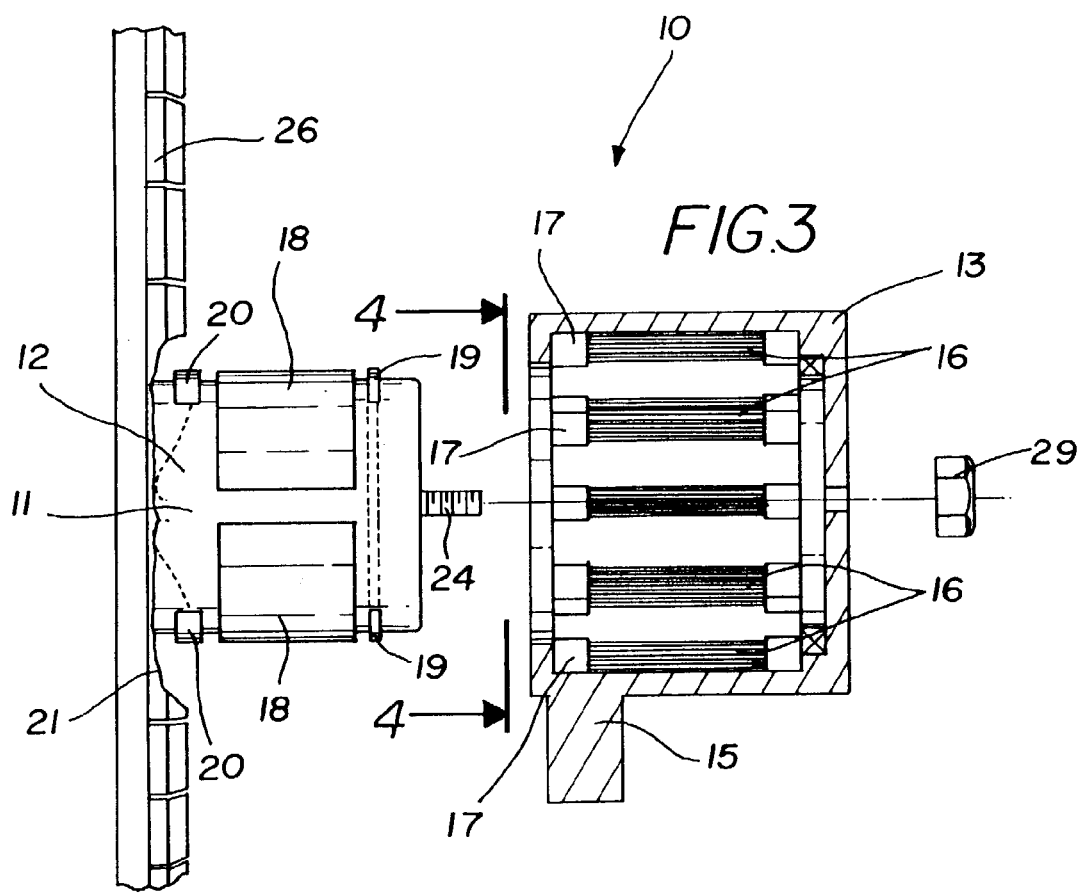
FIG. 3 is an exploded detailed view of the present invention.
Figure 4:
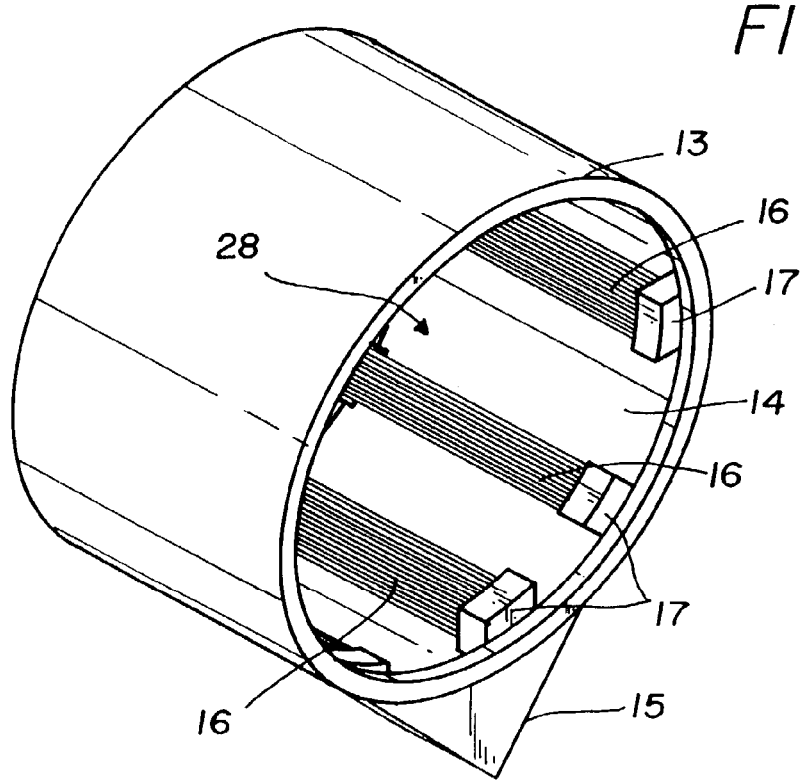
FIG. 4 is a perspective view of the stator means of the present invention.
Figure 5:
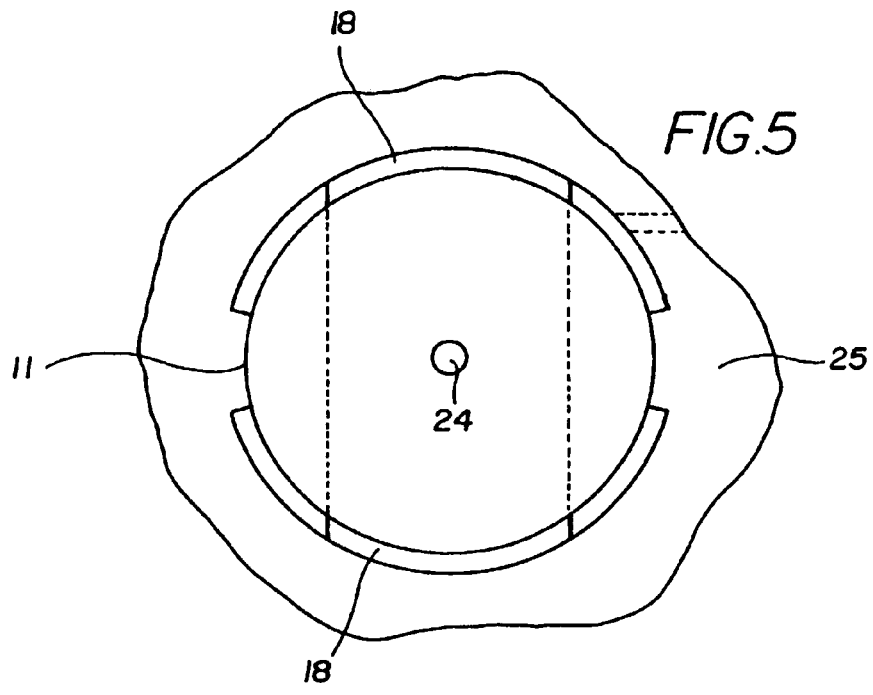
FIG. 5 is a side elevational view of the rotor of the present invention.
Figure 6:
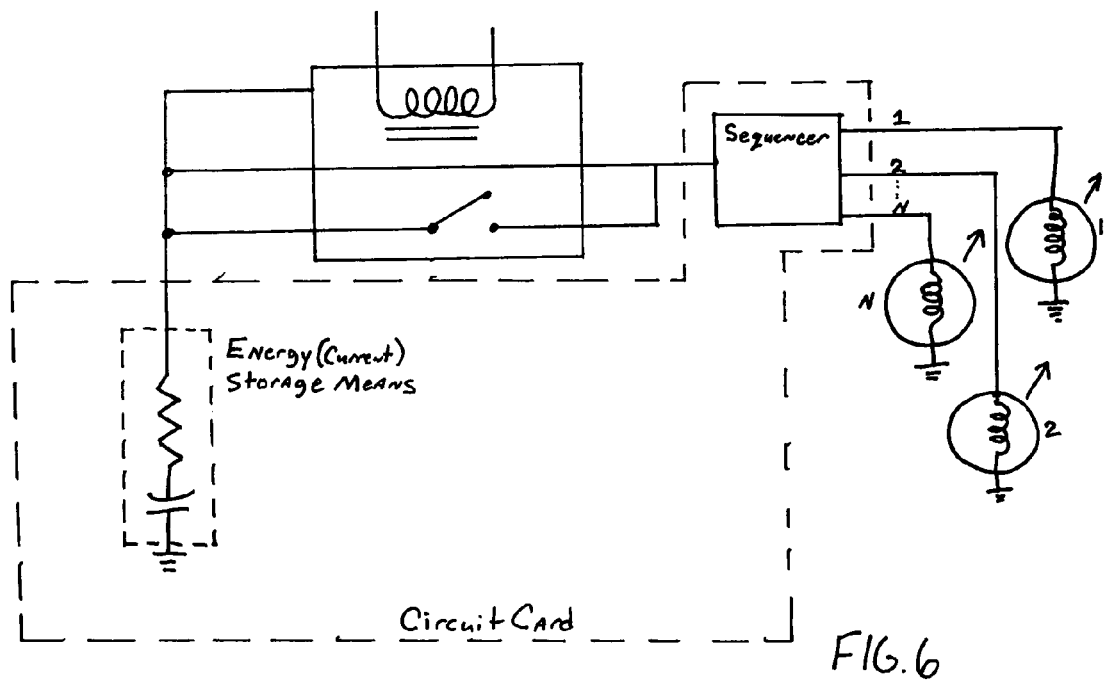
FIG. 6 is a schematic diagram of the present invention.

With reference now to the drawings, and in particular to FIGS. 1 through 6 thereof, a new self-contained light-emitting means for a vehicle embodying the principles and concepts of the present invention and generally designated by the reference numeral 10 will be described.

As best illustrated in FIGS. 1 through 6, the self-contained light-emitting means for a vehicle 10 generally comprises a rotor 11 adapted to be securely and conventionally engaged and mounted upon a wheel axle 24 for rotation therewith and further having an outer surface 12. The rotor 11 is essentially cylindrical. A stationary stator means having a bore 28 therethrough and further having an inner surface 14 defining the bore 28 is adapted to mount about the rotor 11 with the rotor 11 capable of freely rotating within the bore 28. The stator means includes a cylindrical ring 13 which is retained about the rotor 11 with a fastening member 29 such as a nut, and further includes a counterweight member 15 securely and integrally attached to an exterior of the cylindrical ring 13 to substantially prevent the cylindrical ring 13 from rotating when the rotor 11 is rotating. A means for generating an electric current includes a plurality of magnetic members 18 securely disposed and conventionally fastened about the outer surface 12 of the rotor 11. A plurality of brushes 20 are securely and conventionally disposed about the outer surface 12 of the rotor 11 adjacent to the magnetic members 18. A contact member 19 such as an arcuate plate is securely disposed and conventionally fastened about the outer surface 12 of the rotor 11 adjacent to the magnetic members 18. A plurality of sets of wires 16 are arranged parallel and are securely and conventionally disposed about the inner surface 14 of the stator means with the wires 16 extending along the length of the cylindrical ring 13. A plurality of coil members 17 are spaced about and securely and conventionally attached to the inner surface 14 of the stator means. Each of the coil member 17 is connected to a respective set of wires 16. The magnetic members 18 are disposed and arranged so as to move over the sets of wires 16 when the rotor 11 rotates with a wheel 25 for generating an electric current. The brushes 20 are disposed and arranged so as to move over the coil members 17 when the rotor 11 rotates with a wheel 25 for generating an electric current. A light-emitting means is connected to the electric current generating means and is securely and conventionally mounted upon a wheel 25. The light-emitting means includes a plurality of light-emitting members 23 adapted to be securely mounted to a hubcap 26 and further includes a circuit board 22 adapted to be securely mounted to a hubcap 26 and being connected to the light-emitting members 23 and to the means for generating an electric current for essentially controlling a variation of sequential outputs to the light-emitting members 23. The light-emitting members 23 are adapted to be spaced about a circumference of a hubcap 26 and are interconnected to one another with wires 21 and are connected to the circuit board 22 with wires 21. The circuit board 22 is used to store electric current generated by the means for generating an electric current for continued energizing of the light-emitting members 23 even when the rotor 11 is not being rotated. The circuit board 22 is connected with wires 21 to the brushes 20.

In use, when a vehicle is being moved upon a ground surface, the rotor 11 rotates with the axle 24 while the stator means remains stationary because of the counterweight member 15. The magnetic members 18 moves over the plurality of sets of wires 16 and the brushes 20 move over the coil members 17 which all generates an electric current which is stored in the circuit board 22 which energizes the light-emitting members 23. Because the circuit board 22 also stores the electric current, the light-emitting members 23 can also be energized even when the vehicle is not moving and the rotor 11 is not rotating.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-contained light-emitting means for a vehicle wheel comprising:

a rotor securely mounted upon a wheel axle for rotation therewith and further having an outer surface, said rotor being essentially cylindrical;

a stationary stator means having a bore therethrough and further having an inner surface defining said bore, said stator means mounted about said rotor with said rotor capable of freely rotating within said bore, said stator means including a cylindrical ring and a counter weight member securely attached to an exterior of said cylindrical ring to substantially prevent said cylindrical ring from rotating when said rotor is rotating;

a means for generating an electric current including a plurality of magnetic members securely disposed about said outer surface of said rotor; a plurality of brushes securely disposed about said outer surface of said rotor; a contact member also securely disposed about said outer surface of said rotor;

a plurality of sets of wires securely disposed about said inner surface of said stator means; a plurality of coil members spaced about and securely attached to said inner surface of said stator means, each of said coil member being connected to a respective set of wires, said magnetic members being disposed so as to move over said sets of wires when said rotor rotates with a wheel for generating an electric current, said brushes being disposed so as to move over said coil members when said rotor rotates with a wheel for generating an electric current; and a light-emitting means connected to said electric current generating means and being securely mounted upon a wheel, said light-emitting means including a plurality of light-emitting members securely mounted to a hubcap;

a circuit board securely mounted to a hubcap and being connected to said light-emitting members and to said means for generating an electric current for essentially controlling a variation of sequential outputs to said light-emitting members, said light-emitting members being spaced about a circumference of a hubcap and are interconnected to one another with wires and are connected to said circuit board with wires, said circuit board stores electric current generated by said means for generating an electric current for continued energizing of said light-emitting members even when said rotor is not being rotated, said circuit board being connected with wires to said brushes.

* * * * *